US009762125B2

(12) United States Patent
Cheng et al.

(10) Patent No.: US 9,762,125 B2
(45) Date of Patent: Sep. 12, 2017

(54) AREA-EFFICIENT DIFFERENTIAL DIFFERENCE AMPLIFIER COMPENSATOR

(71) Applicant: The Hong Kong University of Science and Technology, Hong Kong (CN)

(72) Inventors: Lin Cheng, New Territories (HK); Wing Hung Ki, Kowloon (HK); Tak Sang Yim, New Territories (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 19 days.

(21) Appl. No.: 14/608,432

(22) Filed: Jan. 29, 2015

(65) Prior Publication Data

US 2015/0236593 A1    Aug. 20, 2015

Related U.S. Application Data

(60) Provisional application No. 61/965,419, filed on Jan. 30, 2014.

(51) Int. Cl.
*H02M 3/158* (2006.01)
(52) U.S. Cl.
CPC ................... *H02M 3/158* (2013.01)
(58) Field of Classification Search
CPC ..... G05F 1/575; H02M 3/156; H02M 3/1563; H02M 3/158
USPC .................................. 323/281, 288
See application file for complete search history.

(56) References Cited

U.S. PATENT DOCUMENTS

| 5,514,947 | A | 5/1996 | Berg | |
|---|---|---|---|---|
| 6,084,476 | A * | 7/2000 | Hamanishi | H03F 3/3023 330/253 |
| 7,170,264 | B1 | 1/2007 | Galinski | |
| 7,834,685 | B1 * | 11/2010 | Pertijs | H03K 5/2472 327/124 |
| 8,036,762 | B1 | 10/2011 | Young et al. | |
| 8,085,005 | B2 | 12/2011 | Dearn | |
| 8,217,637 | B2 | 7/2012 | Tsui et al. | |
| 2009/0316935 | A1 * | 12/2009 | Furst | H03F 1/3211 381/111 |

(Continued)

FOREIGN PATENT DOCUMENTS

| CN | 103354419 A | 10/2013 |
|---|---|---|
| GB | 2440021 A | 1/2008 |

OTHER PUBLICATIONS

Fan, "Design and Characterization of Differentially Enhanced Duty Ripple Control for Switching DC-DC Converter," 2010, Raleigh, North Carolina,167 Pages.

(Continued)

*Primary Examiner* — Adolf Berhane
*Assistant Examiner* — Bart Iliya
(74) *Attorney, Agent, or Firm* — Amin, Turocy & Watson, LLP

(57) ABSTRACT

A differential difference amplifier Type-III compensator of a voltage-mode switching converter can be designed to help regulate an input voltage from a power source. A voltage-mode switching converter can comprise a power stage and a voltage-mode controller. A voltage-mode controller can comprise a compensator, which comprises a differential difference amplifier. The design of the differential difference amplifier Type-III compensator can reduce production costs and enhance power transfer efficiencies.

20 Claims, 10 Drawing Sheets

(56) References Cited

U.S. PATENT DOCUMENTS

| | | | | |
|---|---|---|---|---|
| 2010/0181975 A1* | 7/2010 | Piselli | ............... | H02M 3/33507 323/282 |
| 2012/0268086 A1* | 10/2012 | Chou | ................ | H02M 3/33523 323/234 |
| 2012/0268095 A1* | 10/2012 | Wu | ....................... | H02M 3/156 323/285 |
| 2013/0002212 A1* | 1/2013 | Fan | ..................... | H02M 3/1588 323/235 |

OTHER PUBLICATIONS

Cheng, et al., "A 10/30MHz Wide-Duty-Cycle-Range Buck Converter with DDA-based Type-III Compensator and Fast Reference-Tracking Responses for DVS Ppplications," Solid-State Circuits Conference Digest of Technical Papers (ISSCC), Feb. 2014, pp. 84-85, IEEE, San Francisco, California, 3 Pages.

Kumar, "Design of Fully Differential Operational Amplifier with High Gain, Large Bandwidth and Large Dynamic Range," 2009, 93 Pages, Patiala.

Fandrich, "An On-Chip Transformer-Based Digital Isolator System," Dec. 2013, 68 Pages, Knoxville, Tennessee. http://trace.tennessee.edu/utk_gradthes/2602.

Du, et al., "A 5-MHz 91% Peak-Power-Efficiency Buck Regulator With Auto-Selectable Peak- and Valley-Current Control," IEEE Journal of Solid-State Circuits, Aug. 2011, pp. 1928-1939, vol. 46, No. 8, IEEE, 12 Pages.

Sackinger, et al. "A Versatile Building Block: The CMOS Differential Difference Amplifier," IEEE J. Solid-State Circuits, Apr. 1987, pp. 287-294, vol. 22, No. 2, IEEE, 8 Pages.

Wu, et al., "An Area- and Power-efficient Monolithic Buck Converter with Fast Transient Response," Custom Integrated Circuits Conference, 2009, pp. 307-310, IEEE.

Wu, et al., "Area- and Power-Efficient Monolithic Buck Converters With Pseudo-Type III Compensation," Journal of Solid-State Circuits, Aug. 2010, pp. 1446-1455, vol. 45, No. 8, IEEE.

Hong, et al., "High Area-Efficient DC-DC Converter using Time-Mode Miller Compensation (TMMC)," Symposium on VLSI Circuits, Jun. 2012, pp. 180-181, IEEE.

Fan, et al., "A Low Power High Noise Immunity Boost DC-DC Converter Using the Differential Difference Amplifiers," ISLPED, 2009, pp. 63-68, ACM, San Francisco, California.

Day, "Optimizing Low-Power DC/DC Designs—External versus Internal Compensation," 11 pages. Retrieved on Mar. 6, 2017. https://pdfs.semanticscholar.org/729f/23bd6cb60da1f33e13b961f3874220e11e69.pdf.

* cited by examiner

AREA-EFFICIENT DIFFERENTIAL DIFFERENCE AMPLIFIER COMPENSATOR

RELATED APPLICATION

The subject patent application claims priority to U.S. Provisional Application No. 61/965,419, filed Jan. 30, 2014, and entitled "Area-Efficient DDA Type-III Compensator," the entirety of which is hereby incorporated herein by reference.

TECHNICAL FIELD

This disclosure relates generally to a compensator for numerous electronic devices, e.g., smart phones, televisions, computers, etc. More specifically, this disclosure relates to power management and voltage regulation of electronic devices.

BACKGROUND

Switching converters are modules provided in many portable devices that regulate output voltages from the battery voltage that changes as the battery is depleted. High power efficiency, fast transient response, and small off-chip components (e.g., inductor and output capacitor) are major design concerns of switching converters. To facilitate system miniaturization, the switching converters can switch at a high switching frequency to reduce the volume of the inductor and the output capacitor and to enhance transient response for modern very large scale integration (VLSI) systems.

The above-described background relating to compensators for various applications is merely intended to provide a contextual overview of compensator technology, and is not intended to be exhaustive. Other context regarding amplifier compensation may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
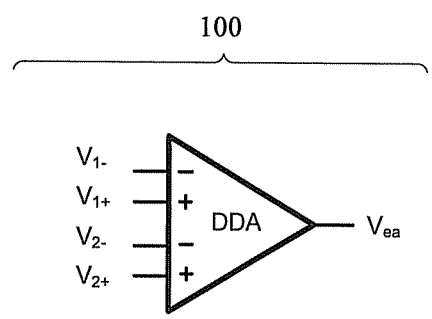
FIG. 1 illustrates an example symbol of a differential difference amplifier.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

High switching frequencies pose problems for designing switching converters. A switching converter can be a voltage-mode switching converter, a current-mode switching converter, or a hysteric-mode switching converter. Current mode control is widely adopted for converters (switching in hundreds of kHz to several MHz) for a fast transient response and relatively simpler loop compensation as compared to voltage mode control. However, it is difficult to implement current mode control for converters switching in the high frequency (HF) (3-30 MHz) or the very high frequency (VHF) (30-300 MHz) range. The current mode control sensing circuit would consume too much power and the duty-cycle range would be limited.

For example, an auto-selectable peak and valley-current control (ASPVCC) can only achieve a duty-cycle range of 0.6 when switching at 5 MHz. The duty-cycle range could be further reduced when switching in the VHF range. Therefore, for a converter switching at over 10 MHz, voltage-mode control is preferred. For a voltage-mode switching converter, the transient response using dominant-pole compensation is too slow. By using a Type-III compensator, the loop bandwidth can be extended and the transient response enhanced. However, on-chip implementation of a conventional Type-III compensator can take up a significant amount of chip area. Type-III compensation can refer to the poles and zeros of the compensator, wherein the compensator can comprise at least two poles and two zeros. Further, Type-II compensation can comprise at least one pole and one zero (also known as pole-zero cancellation compensation), and Type-I compensation can comprise at least one very low frequency pole (also known as dominant-pole compensation).

The voltage-mode switching converter can comprise a power stage and a feedback network. The power stage can comprise inductor(s), filtering capacitor(s), and power semiconductor devices. The feedback network is also known as the voltage-mode controller, wherein the voltage-mode controller can comprise a compensator, an oscillator that can generate a clock signal and a ramp signal, a comparator, a voltage reference circuit that can generate a reference voltage signal, and a logic circuit(s). There can also be a circuit that can generate a scaled output voltage signal from an output voltage.

This application relates to a methodology of synthesizing appropriate compensation responses to linear circuits by using a design comprising a transconductance amplifier, a differential difference amplifier, and a resistor-capacitor (RC) network. The design can either be built-up with discrete components or implemented on chip. For on-chip design, more than 60% of the compensator area can be saved when compared to the use of conventional designs. Therefore, the on-chip design allows for reduction in the number of electronic components being used either on board or on chip level design without sacrificing performance levels. Thus, implementation of this design can decrease the unit die cost and eventually decrease the production cost. The design can be applied to voltage-mode switching converters at very high frequency, and achieve the same performance of complex current-mode switching converters.

Conventional Type-III compensators have two zeros and three poles. Poles and zeros are the frequencies for which the value of the denominator and the value of the numerator of the transfer function becomes zero respectively. The values of the poles and the zeros of a system determine whether the system is stable, and how well the system performs. The first pole is at a very low frequency to achieve a very high DC gain to ensure the DC accuracy of the converter. It is then followed by two real zeros that provide phase boosting to compensate for the decrease in phase due to the complex pole-pair of the power stage. The remaining two poles are placed at frequencies higher than that of the complex pole-pair, and well beyond the loop bandwidth of the converter, to ensure both good phase margin and gain margin.

The two low-frequency zeros are generated by using large resistors and capacitors and will consume a large chip area if integrated on-chip. A pseudo Type-III compensator can save chip area; however, adding two transfer functions to generate the two zeros involves many inter-related parameters and greatly increase design complexity. A time-mode Miller compensation, wherein the compensation components are integrated on-chip, can also reduce the size of chip area. However, the response is much slower than the conventional Type-III compensation.

The current application provides for a new Type-III compensator with a unique structure that results in fewer components and smaller chip area. It comprises a differential difference amplifier, a transconductance amplifier and an RC-circuit network. The differential difference amplifier can be a conventional differential amplifier comprising two coordinated input pairs with an active feedback. The new Type-III compensator can be called a differential difference amplifier (DDA) Type-III compensator. The area of resistors can be reduced by 50%, and the area of metal-insulator-metal (MIM) capacitors can be reduced by 80%. Thus, the total area reduction of the DDA Type-III compensator could be as large as 60%. The total area reduction can be demonstrated in designing the DDA Type-III compensator for a 30 MHz switching converter in 0.13 μm complementary metal-oxide-semiconductor (CMOS) technology.

The transfer function of the transconductance amplifier can be derived as follows:

$$G_{G_{m\_}C}(s) = \frac{g_m r_o}{1 + s r_o C_{mos}} \quad \text{Equation (1)}$$

where $g_m$ and $r_o$ are the transconductance and the output impedance of the transconductance amplifier respectively, and $C_{mos}$ is the output capacitor implemented by a p-type metal-oxide-semiconductor (PMOS) transistor.

The transfer function of the DDA Type-III compensator can be derived as follows:

$$A(s) = (1 + g_m r_o) \frac{\left(1 + \frac{sC_{mos}}{g_m}\right)(1 + s(C_1 + C_2)R_1)}{(1 + sC_{mos}r_o)(1 + sC_2 R_1)} = \quad \text{Equation (2)}$$

$$A_0 \frac{\left(1 + \frac{s}{z_1}\right)\left(1 + \frac{s}{z_2}\right)}{\left(1 + \frac{s}{p_1}\right)\left(1 + \frac{s}{p_2}\right)}$$

where: $A_o = 1 + g_m r_o$; $p_1 = 1/C_{mos}r_o$; $p_2 = 1/C_2 R_1$;

$z_1 = g_m/C_{mos}$; and $z_2 = 1/(C_1 + C_2)R_1$.

From the above equations, it can be shown that the first zero $z_1$ can be determined by the values of $g_m$ and $C_{mos}$ without using a resistor, and $g_m$ can be designed to be very low. More importantly, $C_{mos}$ can be implemented by a CMOS transistor that has a capacitance density approximately five times higher than the MIM capacitor. A large chip area can be saved by this replacement.

For an equivalent comparison, both the proposed DDA Type-III compensator and the conventional Type-III compensator can be fabricated in 0.13 μm CMOS technology, and their transfer functions can be adjusted to be nearly the same. However, the proposed DDA Type-III compensator can achieve an overall 60% reduction in the silicon area.

A voltage-mode switching converter can have an on-chip compensator for frequency compensation, wherein the converter can comprise a power stage having two or more power semiconductor devices. The power stage can perform the basic power conversion from the input voltage to the output voltage and can comprise switches and an output filter. The power stage can provide a converter output in response to an input voltage. The voltage-mode controller can comprise digital logic and analog circuit components used to control the power to the power semiconductor devices. A comparator can be used for combining signals from the on-chip compensator and a ramp generator output. The compensator can comprise a differential difference amplifier with four inputs and one output, a capacitor ($C_{mos}$), a transconductance amplifier, and an RC network.

The DDA Type-III compensator can be represented by the following equations:

The transfer function=$A(s)=\backslash T_{ea}/V_{fb}$     Equation (3)

The low-frequency pole=$-1/C_{mos}r_o$     Equation (4)

The low-frequency zero=$-g_m/C_{mos}$     Equation (5)

The high-frequency pole=$-1/C_2 R_1$     Equation (6)

The high-frequency zero=$-1/[(C_1+C_2)R_1]$     Equation (7)

Equations (3), (4), (5), (6), and (7) can be integrated into the DDA Type-III compensator to provide a final compensation circuit.

The capacitor $C_{mos}$ of the DDA Type-III compensator can comprise a transistor type capacitor. The transistor type capacitor can work together with the output impedance of the transconductance amplifier ($r_o$) to provide the low-frequency pole of Equation (4). The power stage can utilize the output voltage ($V_o$) as a voltage signal to generate a feedback voltage ($V_{fb}$) for the compensator through the resistor-capacitor network across the voltage signal ($V_o$).

The input voltage of the converter ($V_g$) can be regulated to the output voltage of the converter ($V_o$) by means of the voltage-mode switching converter comprising an on-chip compensator, for frequency compensation, and a comparator. The power stage of the voltage-mode switching converter can facilitate an output in response to the input voltage. The voltage-mode switching converter can receive a reference voltage ($V_{ref}$) signal and a feedback voltage signal ($V_{fb}$) indicative of the converter output as inputs to the amplifier $G_m$ to generate the low-frequency pole as represented by Equation (4).

The reference voltage ($V_{ref}$) is a constant voltage irrespective of power supply variations, temperature changes, and the loading on the device. The low-frequency pole of Equation (4) and the low-frequency zero of Equation (5) can be combined with the high-frequency pole of Equation (6) and the high-frequency zero of Equation (7) by a differential difference amplifier to generate an error voltage $V_{ea}$. An error amplifier is most commonly encountered in feedback unidirectional voltage control circuits where the sampled output voltage of the circuit under control is fed back and compared to a stable reference voltage. Any difference between the two generates a compensating error voltage, which tends to move the output voltage towards the design specification.

The differential difference amplifier of the voltage-mode switching converter can comprise four inputs and one output. The four inputs can be implemented by two sets of differential input pairs. The two sets of differential input pairs can have a functional relationship represented by:

$V_{1+}-V_{1-}=-(V_{2+}-V_{2-})$     Equation (8)

As an overview of the various embodiments presented herein, to correct for the above-identified deficiencies and other drawbacks of the conventional DDA Type-III compensators, various embodiments are described herein to facilitate regulating an input voltage by means of a voltage-mode switching converter.

A simplified overview is provided herein to help enable a basic or general understanding of various aspects of exemplary, non-limiting embodiments that follow in the more detailed description and the accompanying drawings. This overview is not intended, however, as an extensive or exhaustive overview. Instead, the purpose of this overview is to present some concepts related to some exemplary non-limiting embodiments in simplified form as a prelude to more detailed descriptions of the various embodiments that follow in the disclosure.

Described herein are systems, methods, articles of manufacture, and other embodiments or implementations that can facilitate the use of a DDA Type-III compensator. The DDA Type-III compensator can be implemented in connection with any type of electronic device that utilizes a switching converter to regulate a voltage source to a suitable voltage for an electronic device function (smart phones, flat panel displays, computers, home electronics, or the like).

A variety of compensators suffer from a high switching frequency and inefficient use of chip area. However, the embodiments of the DDA Type-III compensator presented herein provide several advantages such as: reduced chip area, reduced production costs, and an enhanced power savings.

According to one embodiment, described herein is an apparatus for regulating an input voltage by means of a voltage-mode switching converter. The apparatus can comprise a power stage and a controller, wherein the controller can comprise a compensator and a comparator, wherein the compensator can comprise a differential difference amplifier.

According to another embodiment, described herein is a method for facilitating regulating an input voltage. The method can comprise facilitating a converter output voltage, receiving a reference voltage, receiving a feedback voltage, and combining poles and zeros by a differential difference amplifier to generate an error voltage.

According to yet another embodiment, described herein is another method for facilitating regulating an input voltage. The method can comprise generating, a voltage-mode switching converter output signal in response to an input voltage signal, inputting the voltage-mode switching converter output signal to a transconductance amplifier, and generating an error voltage signal via a differential difference amplifier.

These and other embodiments or implementations are described in more detail below with reference to the drawings.

FIGS. 1-10 illustrate apparatuses and methods that facilitate regulation of an input voltage by a voltage-mode switching converter. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Figure 2:
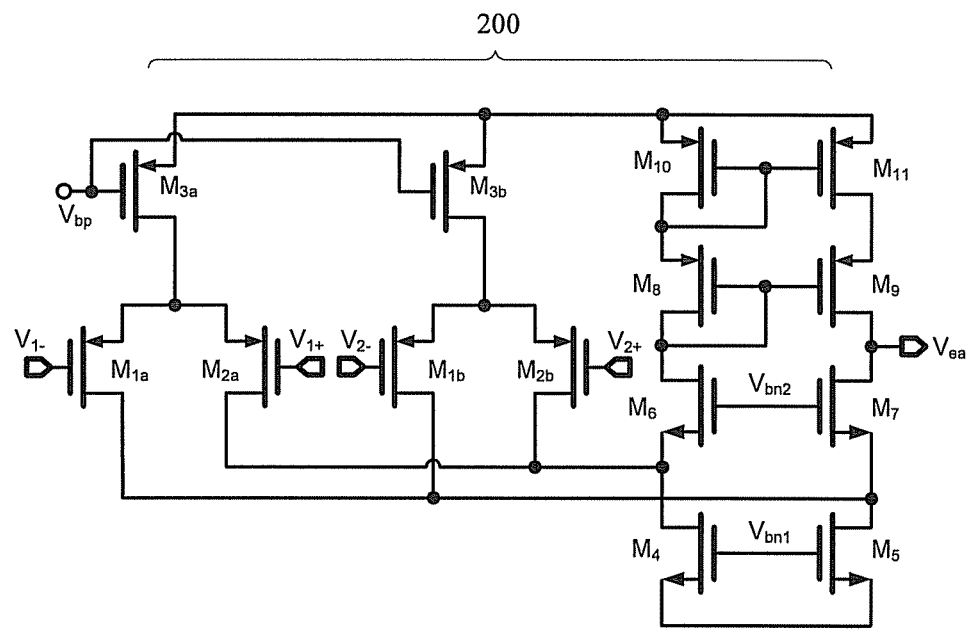
FIG. 2 illustrates an example schematic diagram of a differential difference amplifier.

Referring now to FIG. 1, illustrated is an exemplary symbol of a DDA. The DDA symbol 100 can comprise four inputs represented by two sets of differential input pairs $(V_{1+}, V_{1-}, V_{2+}, V_{2-})$. The two sets of input pairs can have the functional relationship as represented by Equation (8). The DDA can also comprise one output represented by an error voltage $(V_{ea})$. Referring now to FIG. 2, illustrated is an exemplary schematic diagram of a DDA. The DDA schematic 200 can represent the DDA symbol 100. An output voltage of a circuit system can be fed back and compared to another reference voltage. Any difference between the output voltage and the reference voltage can generate a compensating error voltage $(V_{ea})$, which can move the output voltage towards a design specification.

Figure 3:
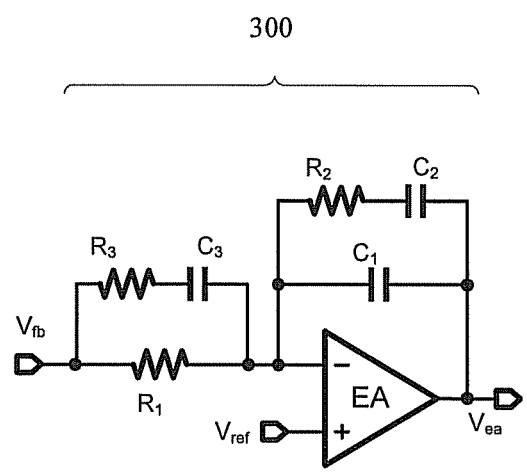
FIG. 3 illustrates an example schematic of a conventional Type-III compensator using an error amplifier.

Referring now to FIG. 3, illustrated is an exemplary schematic diagram of a conventional Type-III compensator that is built around a differential amplifier. An output voltage of a circuit system $(V_o)$ can be scaled down to serve as the feedback voltage $(V_{fb})$ to the compensator and compared to a reference voltage $(V_{ref})$. Any difference between $V_{fb}$ and $V_{ref}$ can generate a compensating error voltage $(V_{ea})$, which can move the output voltage of the circuit system $V_o$ towards a design specification.

Conventional Type-III compensators can have two zeros and three poles. The first pole can be at a very low frequency to achieve a very high direct current (DC) gain and ensure the DC accuracy of the voltage-mode switching converter. It can then be followed by two real zeros that provide phase boosting to compensate for the decrease in phase, due to the complex pole-pair of the power stage. The remaining two poles can be placed at frequencies higher than that of the complex pole-pair and well beyond the loop bandwidth of the converter to ensure both good phase margin and gain margin. The two low frequency zeros can be generated by using large resistors and capacitors, and can consume large chip area if integrated on-chip.

Conventional Type-III compensators 300 can pose problems for designing switching converters that operate at high switching frequencies because it is difficult to implement current-mode control for converters switching in the HF (3-30 MHz) or the VHF (30-300 MHz) range. A current sensing circuit can consume too much power, thereby limiting the duty-cycle range. For a voltage-mode switching converter, the transient response using dominant-pole compensation (also known as Type-I compensation) is too slow. On-chip implementation of the conventional Type-III compensator 300 can also take up large chip areas.

Figure 4:
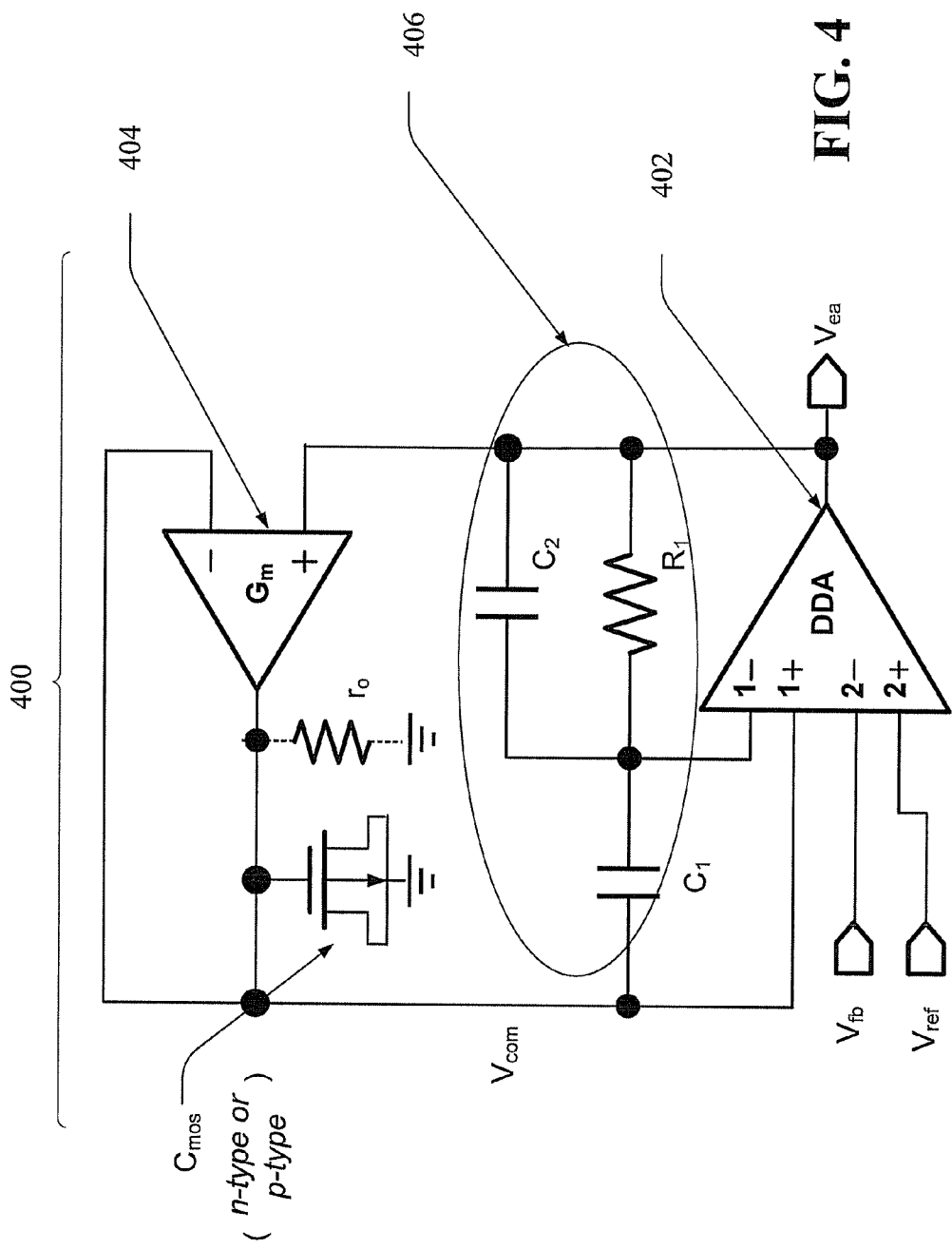
FIG. 4 illustrates an example schematic of a Type-III compensator using a differential difference amplifier.

Referring now to FIG. 4, illustrated is an exemplary schematic of a DDA Type-III compensator with two transfer functions. The DDA Type-III compensator 400 can comprise two transfer functions to generate two zeros. One zero can be generated by a MOS capacitor $(C_{mos})$ and the output impedance of the transconductance amplifier $(r_o)$ to reduce the chip area.

By using the DDA Type-III compensator 400, loop bandwidth can be extended and the transient response can be enhanced. The DDA Type-III compensator 400 can comprise a unique structure that results in fewer components and a smaller chip area. The components of the DDA Type-III compensator 400 can comprise a differential difference amplifier 402, a transconductance amplifier 404, and a resistor-capacitor network 406. The differential difference amplifier 402 can comprise two coordinated input pairs, and an active feedback amplifier. The coordinated input pairs of the differential difference amplifier 402 can be represented by two sets of differential input pairs $(V_{1+}, V_{1-}, V_{2+}, V_{2-})$. The two sets of input pairs can have the functional relationship as represented by Equation (8). The differential difference amplifier 402 can also comprise one output represented by an error voltage $(V_{ea})$. An output voltage of a circuit system $(V_o)$ can be scaled to be the feedback voltage $V_{fb}$ and compared to another reference voltage $(V_{ref})$. Any difference between the feedback voltage ($V_{fb}$) and the reference voltage ($V_{ref}$) can generate a compensating error voltage ($V_{ea}$), which can move the output voltage towards a design specification.

Figure 5:
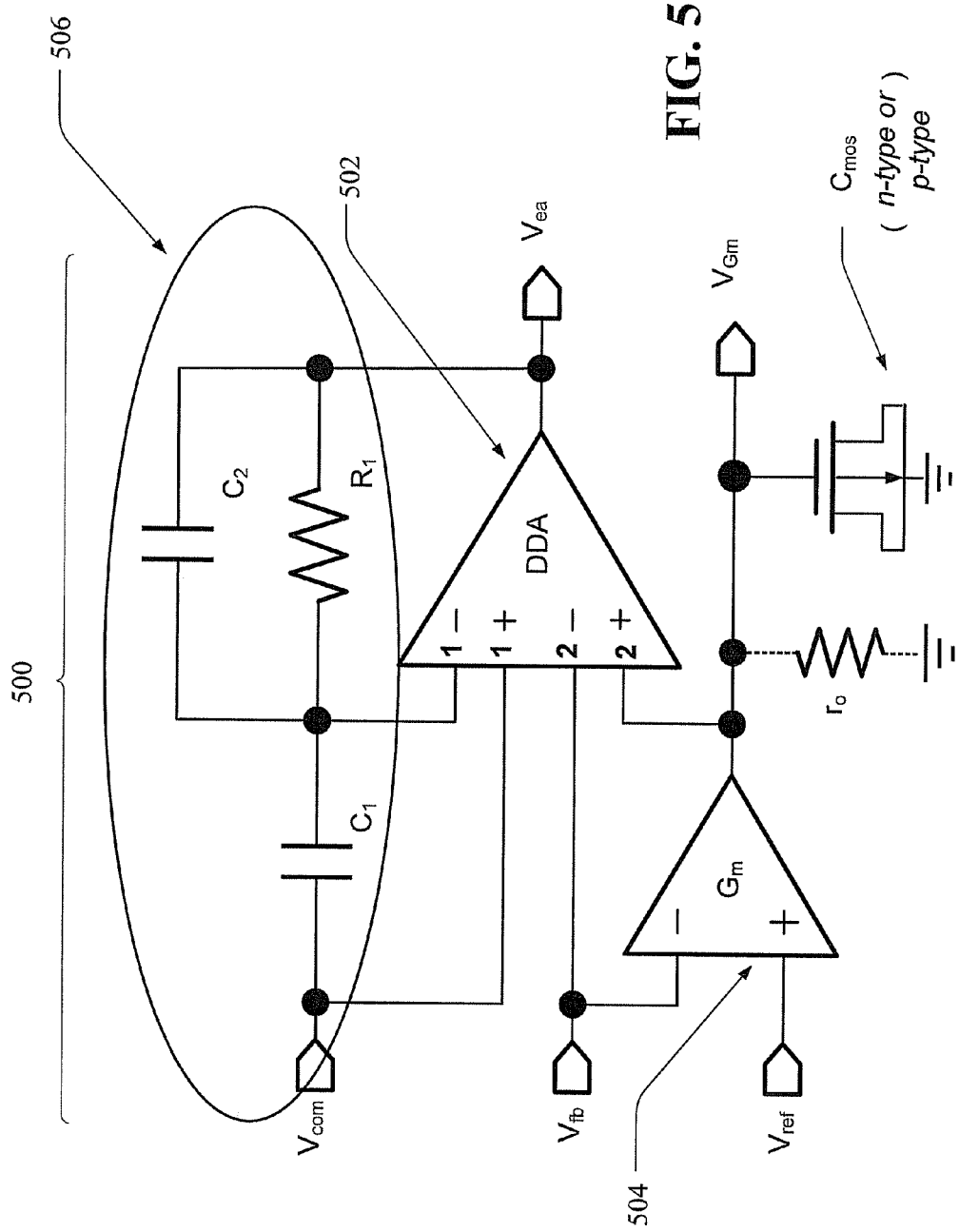
FIG. 5 illustrates another example of a Type-III compensator using a differential difference amplifier.

Referring now to FIG. 5, illustrated is another exemplary schematic of a DDA Type-III compensator with two transfer functions. The DDA Type-III compensator 500 can comprise two transfer functions to generate two zeros. One zero can be generated by a MOS capacitor ($C_{mos}$) and the output impedance of the transconductance amplifier ($r_o$) to reduce the chip area.

By using the DDA Type-III compensator 500, loop bandwidth can be extended and the transient response can be enhanced. The DDA Type-III compensator 500 can comprise a unique structure that results in fewer components and smaller chip area. The components of the DDA Type-III compensator 500 can comprise a differential difference amplifier 502, a transconductance amplifier 504, and a resistor-capacitor network 506. The differential difference amplifier 502 can comprise two coordinated input pairs, and an active feedback amplifier. The coordinated input pairs of the differential difference amplifier 502 can be represented by two sets of differential input pairs ($V_{1+}$, $V_{1-}$, $V_{2+}$, $V_{2-}$). The two sets of input pairs can have the functional relationship as represented by Equation (8). The differential difference amplifier 402 can also comprise one output represented by an error voltage ($V_{ea}$). An output voltage of a circuit system ($V_o$) can be scaled to be the feedback voltage $V_{fb}$ and compared to another reference voltage ($V_{ref}$). Any difference between the feedback voltage ($V_{fb}$) and the reference voltage ($V_{ref}$) can generate a compensating error voltage ($V_{ea}$), which can move the output voltage towards a design specification.

Figure 6:
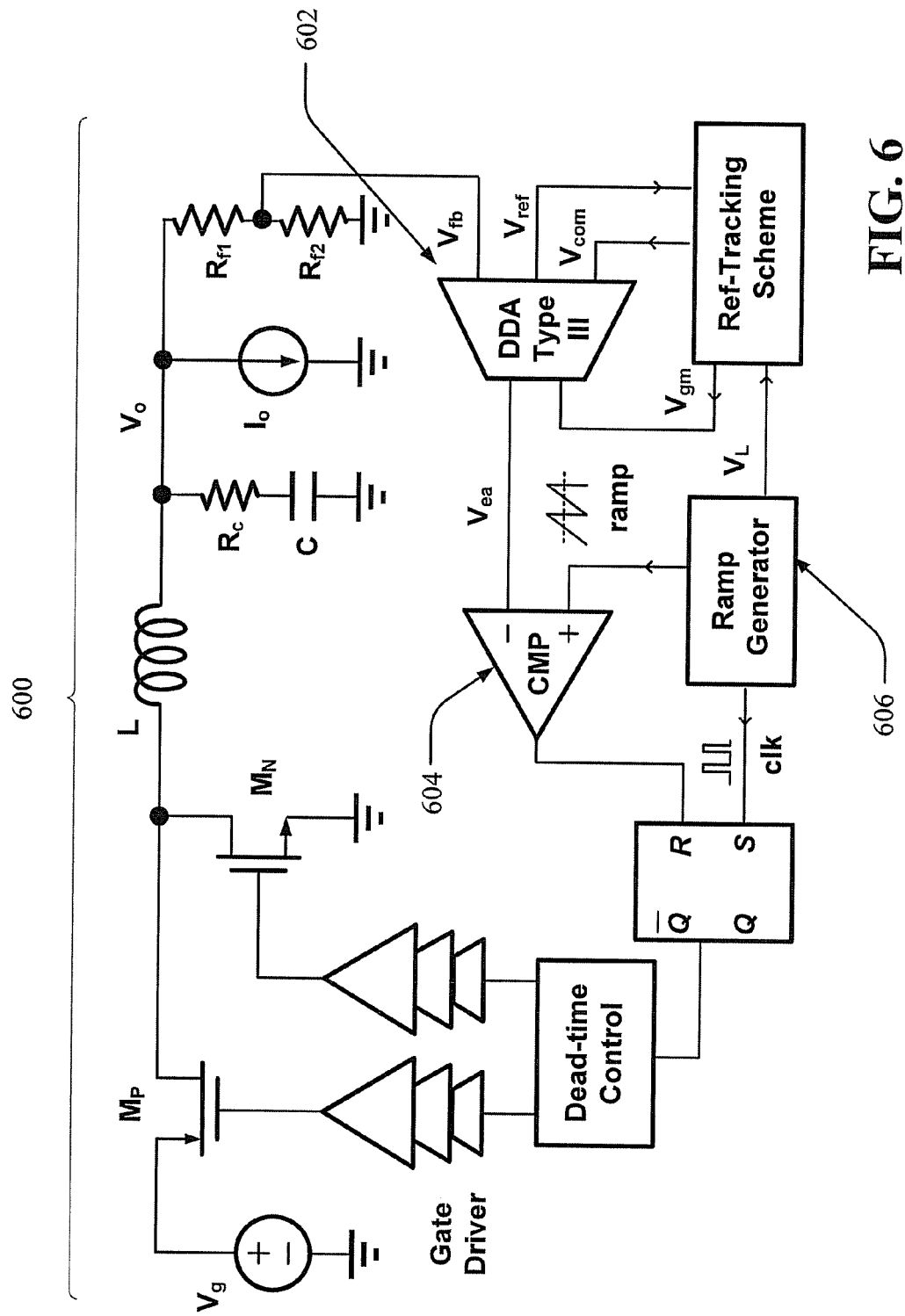
FIG. 6 illustrates an example schematic of a Type-III compensator using a differential difference amplifier being integrated into a switching converter.

Referring now to FIG. 6, illustrated is an exemplary schematic of a DDA Type-III compensator being integrated into a switching converter. The switching converter 600 can comprise a DDA Type-III compensator 602. The DDA Type-III compensator 602 can receive a feedback voltage ($V_{fb}$) comprising a DC-DC output voltage ($V_o$) and a reference voltage ($V_{ref}$) from a voltage reference circuit to provide frequency compensation to the switching converter 600.

The voltage-mode controller can comprise the logic used to control the power to the semiconductor devices. A compensator can comprise a DDA Type-III compensator 602 with four inputs and one output, and the DDA Type-III compensator 602 can comprise a differential difference amplifier (DDA) 502, a capacitor ($C_{mos}$), a transconductance amplifier 504, and a resistor-capacitor network 506. The power stage of the switching converter can output a voltage signal ($V_o$) to generate a feedback voltage ($V_{fb}$) for the compensator through the resistor-capacitor network across the voltage signal ($V_o$). A comparator 604 can be used to combine signals from the differential amplifier 602 and a ramp generator 606 output.

Figure 7:
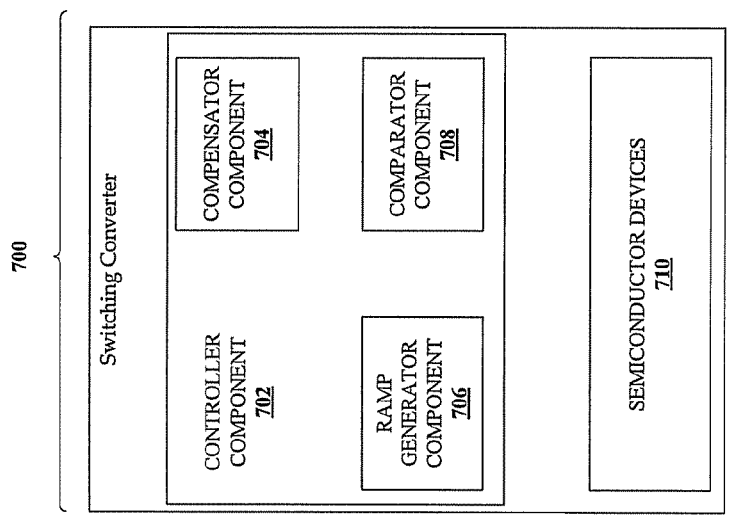
FIG. 7 illustrates an example system block diagram of a switching converter apparatus.

FIG. 7 illustrates an exemplary system block diagram of a voltage-mode switching converter apparatus. A voltage-mode switching converter 700 can perform the basic power conversion from the input voltage to the output voltage. The voltage-mode switching converter can have a voltage-mode controller component 702 and power semiconductor devices 710. The voltage-mode controller component 702 can comprise an on-chip compensator component 704, a ramp generator component 706, and a comparator component 708. The input voltage can be regulated according to the actions of the voltage-mode controller component 702 that drives the power semiconductor devices 710 to give the designed output voltage.

The voltage-mode controller component 702 can regulate power to the semiconductor devices 710, and the comparator component 708 can combine the compensator component 704 signal and the ramp generator component 706 output signal. The voltage-mode controller component 702 can be an electronic module, which compares a feedback voltage signal with a reference voltage signal and can generate the signals to drive the power semiconductor devices 710. The voltage-mode controller component 702 can comprise the logic used to control the power to the semiconductor devices 710. The comparator component 708 can be used for combining signals from the on-chip compensator component 704 and the ramp generator component 706 output. The compensator component 704 can comprise a differential difference amplifier 502 with four inputs and one output, a capacitor ($C_{mos}$), a transconductance amplifier 504, and a resistor-capacitor network 506.

Figure 8:
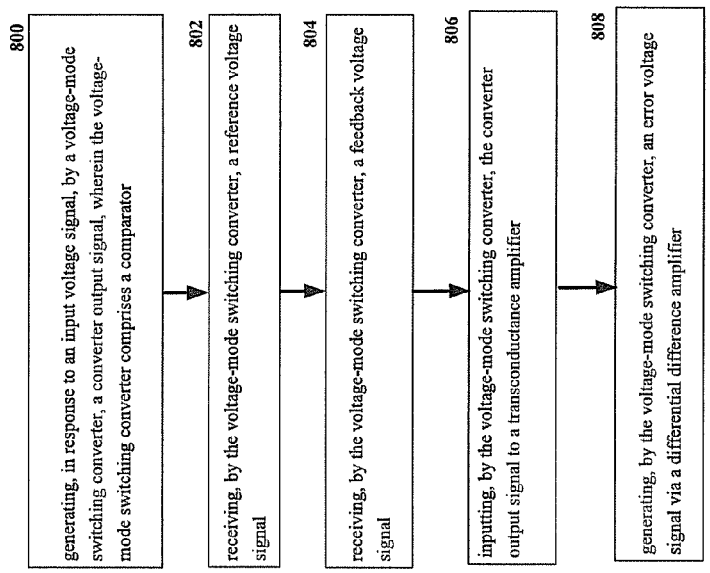
FIG. 8 illustrates an example system block diagram of a method for regulating an input voltage.

FIG. 8 illustrates an exemplary system block diagram of a method for regulating an input voltage. At element 800 a switching converter output signal can be generated in response to an input voltage signal, by a voltage-mode switching converter, wherein the voltage-mode switching converter comprises a comparator. At element 802 the voltage-mode switching converter can receive a reference voltage signal. At element 804 the voltage-mode switching converter can receive a feedback voltage signal. The power stage can utilize the voltage-mode controller and the converter output signal (Vo) to generate a feedback voltage signal (Vfb) for the compensator through the resistor-capacitor network across the voltage signal (Vo).

At element 806, the voltage-mode switching converter can input the feedback voltage signal (Vfb) to a transconductance amplifier; and at element 808, an error voltage signal (Vea) can be generated via a differential difference amplifier. The input voltage can be regulated by means of the voltage-mode switching converter comprising an on-chip compensator, for frequency compensation, and a comparator. The power stage of the voltage-mode switching converter can facilitate an output in response to the input voltage. The voltage-mode switching converter can also receive a reference voltage signal (Vref) and a feedback voltage signal (Vfb) indicative of the converter output as inputs to a transconductance amplifier to generate the low-frequency pole.

Optionally, it is noted the voltage-mode switching converter output signal can comprise a reference voltage signal. The reference voltage signal can be in response to a bandgap voltage. In addition, the voltage-mode switching converter output signal can comprise a feedback signal.

Figure 9:
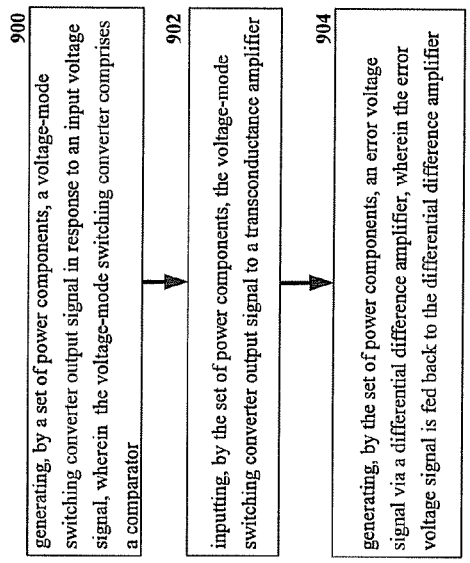
FIG. 9 illustrates an example system block diagram of a method for regulating an input voltage.

FIG. 9 illustrates an exemplary system block diagram of a method for regulating an input voltage. At element 900 a set of power components can generate a voltage-mode switching converter output signal in response to an input voltage signal, wherein the voltage-mode switching converter can comprise a comparator. The comparator can be used for combining signals from an on-chip compensator and a ramp generator output. The compensator can comprise a differential difference amplifier with four inputs and one output, a capacitor (Cmos), a transconductance amplifier, and a resistor-capacitor network.

At element 902 the set of power components can input the voltage-mode switching converter output signal to a transconductance amplifier. At element 904 the set of power components can generate an error voltage signal via a differential difference amplifier, wherein the error voltage signal can be fed back to the differential difference amplifier. The output voltage signal of the circuit under control can be fed back and compared to a stable reference voltage signal. The difference between the two can generate a compensating error voltage, which can adjust the output voltage.

Figure 10:
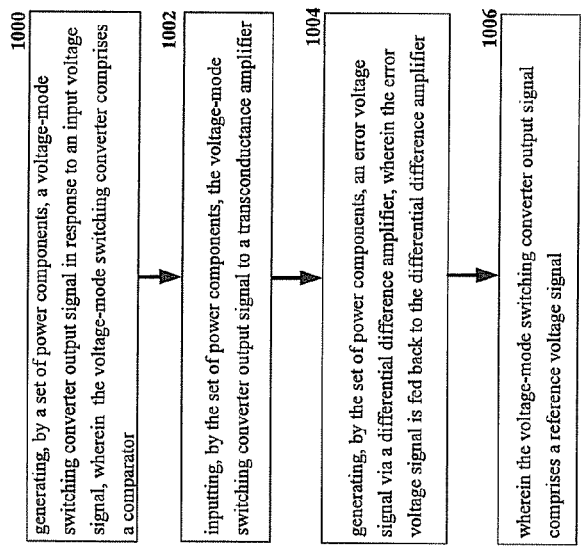
FIG. 10 illustrates an example system block diagram of a method for regulating an input voltage comprising a reference voltage signal.

FIG. 10 illustrates an exemplary system block diagram of a method for regulating an input voltage comprising a reference voltage signal. At element 1000 a set of power components can generate a voltage-mode switching converter output signal in response to an input voltage signal, wherein the voltage-mode switching converter can comprise a comparator. The comparator can be used for combining signals from an on-chip compensator and a ramp generator output. The compensator can comprise a differential amplifier with four inputs and one output, a capacitor (Cmos), a transconductance amplifier, and a resistor-capacitor network.

At element 1002 the set of power components can input the voltage-mode switching converter output signal to a transconductance amplifier. At element 1004 the set of power components can generate an error voltage signal via a differential difference amplifier, wherein the error voltage signal can be fed back to the differential difference amplifier. The voltage-mode switching converter output signal can comprise a reference voltage signal at element 1006. The output voltage signal of the circuit under control can be fed back and compared to a stable reference voltage signal. The difference between the two can generate a compensating error voltage, which can adjust the output voltage.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. An apparatus, comprising:
a voltage-mode switching converter component, comprising power semiconductor devices, that provides a converter output in response to an input voltage, wherein the input voltage is regulated according to a compensator output signal of a compensator;
a voltage-mode controller that regulates power to the power semiconductor devices, via the compensator, wherein the compensator comprises a differential difference amplifier that receives a feedback voltage and receives an output signal from a transconductance amplifier, wherein the compensator comprises the transconductance amplifier that receives a reference voltage, and receives the feedback voltage, and sends the output signal to the differential difference amplifier, and wherein the differential difference amplifier compares the output signal and the feedback voltage to generate an error voltage; and
a comparator that receives the error voltage from the compensator via a frequency compensation, wherein the compensator output signal is electronically connected to a terminal of the comparator to generate a duty cycle to control the power semiconductor devices.

2. The apparatus of claim 1, wherein the compensator comprises a resistor-capacitor network.

3. The apparatus of claim 1, wherein the compensator achieves a transfer function.

4. The apparatus of claim 1, wherein the compensator facilitates a two zero compensation.

5. The apparatus of claim 1, wherein the compensator comprises a low-frequency pole, and wherein the low-frequency pole comprises a frequency below that of the two zeros.

6. The apparatus of claim 1, wherein the compensator comprises a high-frequency pole, and wherein the high-frequency pole comprises a frequency above that of the two zeros.

7. The apparatus of claim 1, wherein the differential difference amplifier combines two poles and two zeros.

8. The apparatus of claim 2, wherein a capacitor, of the resistor-capacitor network, comprises a transistor type capacitor.

9. The apparatus of claim 1, wherein the voltage-mode switching converter component converts the input voltage to an output voltage.

10. The apparatus of claim 1, wherein the feedback voltage is a first feedback voltage, and wherein the voltage-mode switching converter component generates a second feedback voltage.

11. A method, comprising:
generating, in response to an input voltage signal of a voltage-mode switching converter comprising a compensator, a converter output signal, wherein the input voltage is regulated according to a compensator output signal, and wherein the compensator is electrically connected to the voltage-mode switching converter to compensate for a frequency change;
receiving, by a transconductance amplifier of the compensator, a reference voltage signal;
receiving, by the transconductance amplifier of the compensator, a feedback voltage signal;
comparing, by the transconductance amplifier of the compensator, the reference voltage signal and the feedback voltage signal, resulting in another output signal;
transmitting, by the transconductance amplifier of the compensator, the other output signal to a differential difference amplifier of the compensator;
receiving, by the differential difference amplifier of the compensator, the feedback voltage signal;
in response to the transmitting and the receiving the feedback voltage signal, generating, by the compensator, an error voltage signal via the differential difference amplifier of the compensator; and
inputting, by the compensator, the error voltage signal to a comparator that is electrically connected to the compensator.

12. The method of claim 11, wherein the inputting is used to generate a low-frequency pole, and wherein the low-frequency pole is located at a frequency below that of two zeros.

13. The method of claim 11, wherein the generating of the error voltage signal of the compensator comprises combining two zeros with two poles, and wherein a low-frequency pole is below that of the two zeros and a high-frequency pole is above that of the two zeros.

14. The method of claim 11, wherein the differential difference amplifier comprises four inputs and one output.

15. The method of claim 14, wherein the four inputs comprise two sets of differential input pairs.

16. The method of claim 15, wherein a transfer function comprises the error voltage signal and the feedback voltage signal.

17. A method, comprising:
  generating, by a set of power semiconductor devices, an output voltage signal of a voltage-mode switching converter in response to an input voltage signal, wherein the voltage-mode switching converter comprises a compensator, and wherein the compensator comprises a differential difference amplifier;
  inputting, by the set of power semiconductor devices, a first voltage signal from a transconductance amplifier to the differential difference amplifier, wherein the first voltage signal is based on a comparison of the first voltage signal and a second voltage signal from the differential difference amplifier, wherein the second voltage signal is an error voltage signal;
  inputting, by the set of power semiconductor devices, a feedback voltage signal and a reference voltage signal to the differential difference amplifier;
  comparing, by the set of power semiconductor devices, the reference voltage signal, the first voltage signal, and the feedback voltage signal via the differential difference amplifier of the compensator;
  based on a result of the comparing, generating, by the set of power semiconductor devices, the error voltage signal to be output to a comparator; and
  outputting, by the set of power semiconductor devices, the error voltage signal to the comparator via the compensator.

18. The method of claim 17, wherein the inputting the reference voltage is used to generate a low-frequency pole, and wherein the low-frequency pole is located at a frequency below that of two zeros.

19. The method of claim 17, wherein the generating of the error voltage signal comprises combining two zeros with two poles, and wherein a low-frequency pole is below that of the two zeros and a high-frequency pole is above that of the two zeros.

20. The method of claim 17, wherein the differential difference amplifier comprises coordinated input pairs with an active feedback.

* * * * *